United States Patent [19]

McNabb et al.

[11] Patent Number: 5,636,867

[45] Date of Patent: Jun. 10, 1997

[54] ROLLOVER PROTECTIVE STRUCTURE AND METHOD

[75] Inventors: Robert L. McNabb, Monticello; Joseph A. Rapp, Morris, both of Ill.

[73] Assignee: Caterpillar Inc., Peoria, Ill.

[21] Appl. No.: 557,638

[22] Filed: Nov. 14, 1995

[51] Int. Cl.$^6$ .................................................. B60R 21/13
[52] U.S. Cl. ......................................... 280/756; 180/89.12
[58] Field of Search ........................... 280/756; 180/89.12

[56] References Cited

U.S. PATENT DOCUMENTS

| | | | |
|---|---|---|---|
| 3,632,134 | 1/1972 | Babbitt, Jr. et al. | 280/756 |
| 3,985,386 | 10/1976 | Woods | 280/756 |
| 4,136,985 | 1/1979 | Taul | 280/756 |
| 4,781,260 | 11/1988 | Morita et al. | 280/756 |
| 5,280,955 | 1/1994 | Nelson et al. | 280/756 |

Primary Examiner—Kenneth R. Rice
Attorney, Agent, or Firm—Dennis C. Skarvan

[57] ABSTRACT

A rollover protective structure (ROPS) for use with construction machinery includes a base, four upright posts attached to the base and cross members attached between the posts to define generally a box-like structure. Two of the posts define a forward side of the structure. The other two posts define opposing ends of the structure. First and second reinforcing members are attached within the first and second posts to the forward sides, respectively, for selective reinforcement of the forward sides. Third and fourth reinforcing members are attached within the third and fourth posts to the opposing ends for selective reinforcement of the opposing ends, respectively. The first and second reinforcing members extend between the base member and cross member, and the third and fourth reinforcing members extend between the base member to above the cross member.

15 Claims, 4 Drawing Sheets

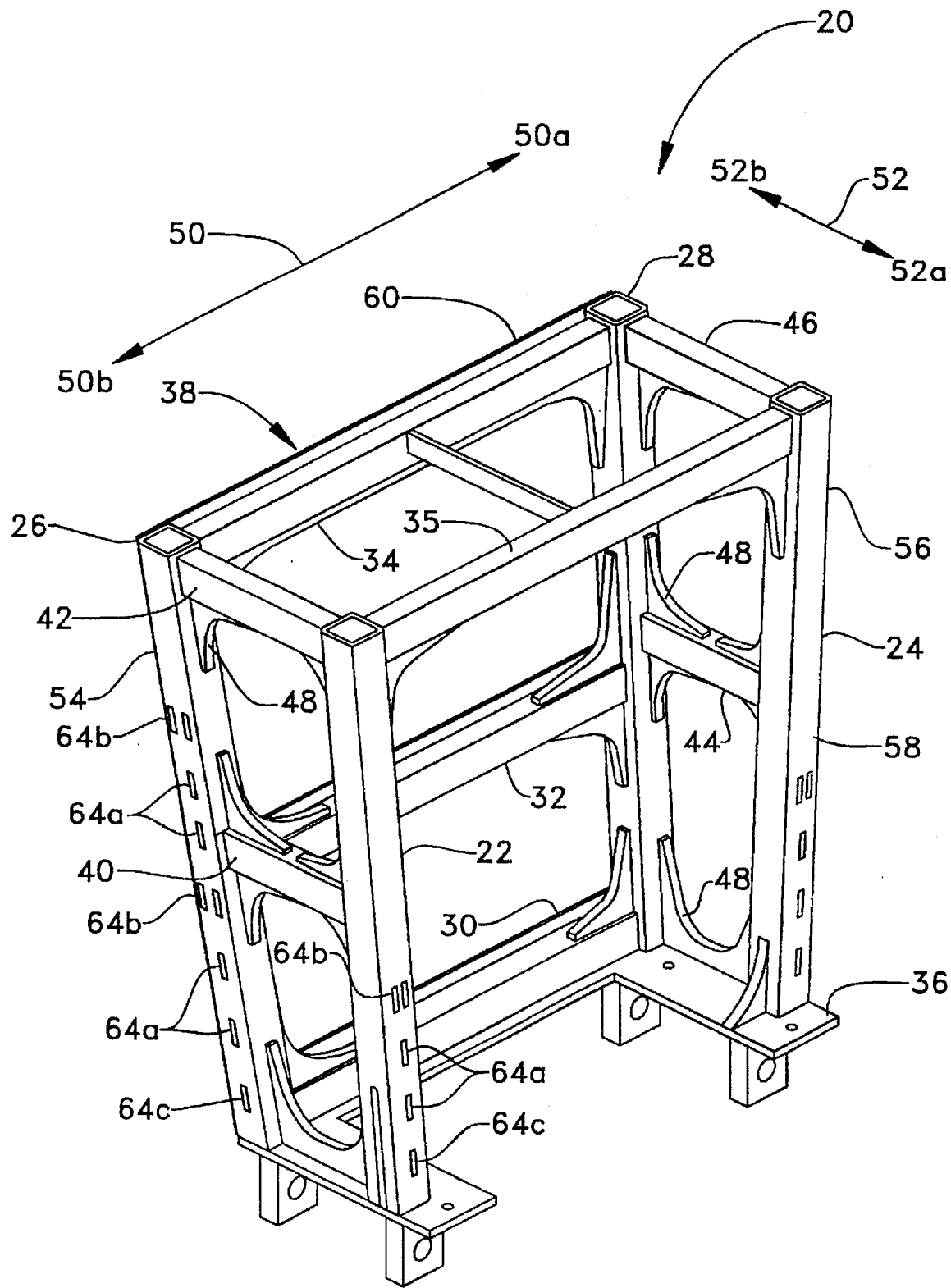
Fig_1_

Fig_2_
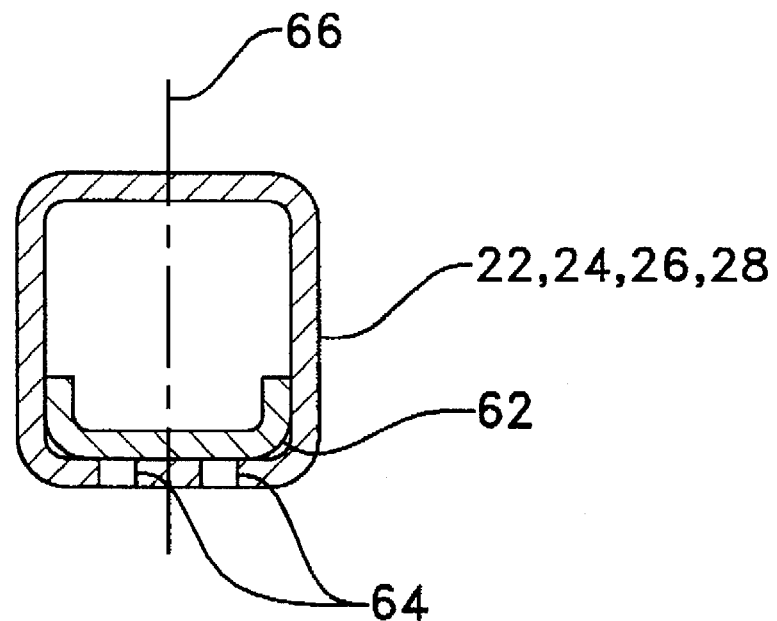
Fig_3_
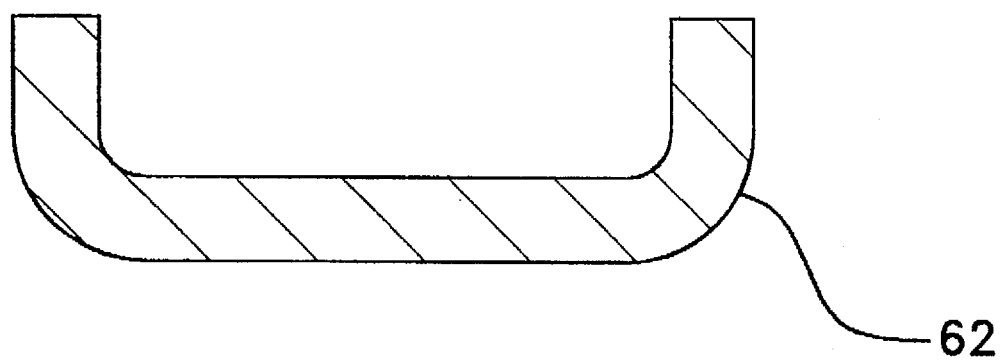

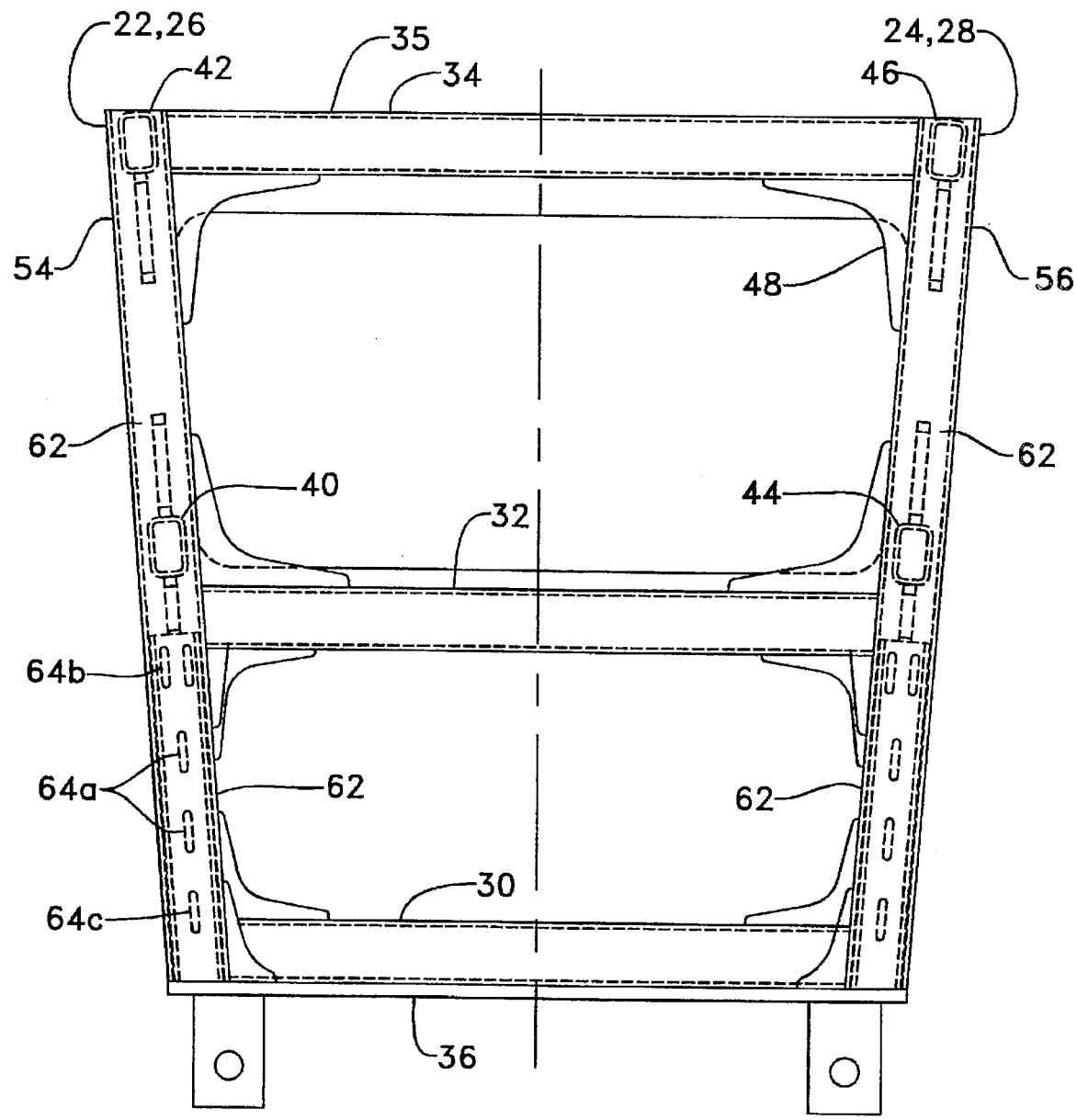

ROLLOVER PROTECTIVE STRUCTURE AND METHOD

TECHNICAL FIELD

The present invention relates generally to rollover protective structures for use with construction machinery and, more particularly, to the reinforcement of four-post rollover protective structures.

BACKGROUND ART

Rollover protective structures (ROPS) are useful to protect the operator of construction equipment from injury in the event of operator error such as the operator rolling the equipment. Such structures are typically fabricated of various support members attached together to form a frame surrounding the operator. The frame can be generally box-like by virtue of having four posts supporting a canopy (four-post ROPS), or can simply include two posts supporting a canopy (two-post ROPS). Regardless of the type of ROPS, the structure is desirably capable of deforming in a controlled manner under adverse loading conditions in order to protect the operator.

Although a four-post ROPS frame is inherently stable, a need still exists for a structure and method for selectively reinforcing a four-post ROPS frame to provide additional resistance to load deformation under extreme loading conditions with a minimum increase in weight and cost.

DISCLOSURE OF THE INVENTION

According to one embodiment of the present invention, a rollover protective structure for use with construction machinery is disclosed, comprising a base member, four posts each including a hollow portion attached to the base member and a number of cross members attached between the four posts, the four posts and the number of cross members defining generally a box-like structure, first and second of the four posts including first and second sides, respectively, facing a first direction, a third of the four posts including a third side facing a second direction transverse to the first direction and the fourth of the four posts including a fourth side facing a third direction transverse to the first direction and opposite the second direction, first and second reinforcing members attached to the first and second sides within the hollow portion of the first and second posts, respectively, for reinforcing the first and second sides, and third and fourth reinforcing members attached to the third and fourth sides within the hollow portion of the third and fourth posts, respectively, for reinforcing the third and fourth sides.

According to another embodiment of the present invention, a rollover protective structure for use with construction machinery is disclosed, comprising a base member, a first tubular post attached to the base member, the first post being rectangular in cross-section and defining a first side facing a first direction, a second tubular post attached to the base member, the second post being rectangular in cross-section and defining a second side facing a second direction transverse to the first direction, a cross member attached between the first post and the second post, the first post defining a first central axis and the second post defining a second central axis, a first reinforcing member adapted for receipt in the first post adjacent to the first side for reinforcing the first side, a second reinforcing member adapted for receipt in the second post adjacent to the second side for reinforcing the second side, first means, disposed along the first axis, for attaching the first reinforcing member to the first post, and second means, disposed along the second axis for attaching the second reinforcing member to the second post.

According to another embodiment of the present invention, a method for reinforcing a rollover protective structure of a construction machine is disclosed, the rollover protective structure including a base member, four posts each including a hollow portion attached to the base member and a number of cross members attached between the four posts, the four posts and the number of cross members defining generally a box-like structure, first and second of the four posts including first and second sides, respectively, facing a first direction, a third of the four posts including a third side facing a second direction transverse to the first direction and the fourth of the four posts including a fourth side facing a third direction transverse to the first direction and opposite the second direction, the method comprising the steps of, attaching first and second reinforcing members to the first and second sides within the hollow portion of the first and second posts, respectively, for reinforcing the first and second sides, and attaching third and fourth reinforcing members to the third and fourth sides within the hollow portion of the third and fourth posts, respectively, for reinforcing the third and fourth sides.

According to another embodiment of the present invention, a method for reinforcing a rollover protective structure for use with construction machinery is disclosed, the rollover protective structure including a base member, a first tubular post attached to the base member, the first post being rectangular in cross-section and defining a first side facing a first direction, a second tubular post attached to the base member, the second post being rectangular in cross-section and defining a second side facing a second direction transverse to the first direction, a cross member attached between the first post and the second post, the first post defining a first central axis and the second post defining a second central axis, the method comprising the steps of obtaining a first reinforcing member adapted for receipt in the first post adjacent to the first side for reinforcing the first side, obtaining a second reinforcing member adapted for receipt in the second post adjacent to the second side for reinforcing the second side, attaching the first reinforcing member within the first post adjacent to the first side along the first axis, and attaching the second reinforcing member within the second post adjacent to the second side along the second axis.

BRIEF DESCRIPTION OF THE DRAWINGS

FIG. 1 is a front perspective view of a four-post ROPS according to one embodiment of the present invention.

FIG. 2 is a cross-sectional view of a post including a reinforcing member of the ROPS of FIG. 1.

FIG. 3 is a cross-sectional view of the reinforcing member of FIG. 2.

FIG. 4 is a front elevational view of the ROPS of FIG. 1.

BEST MODE FOR CARRYING OUT THE INVENTION

Figure 5:
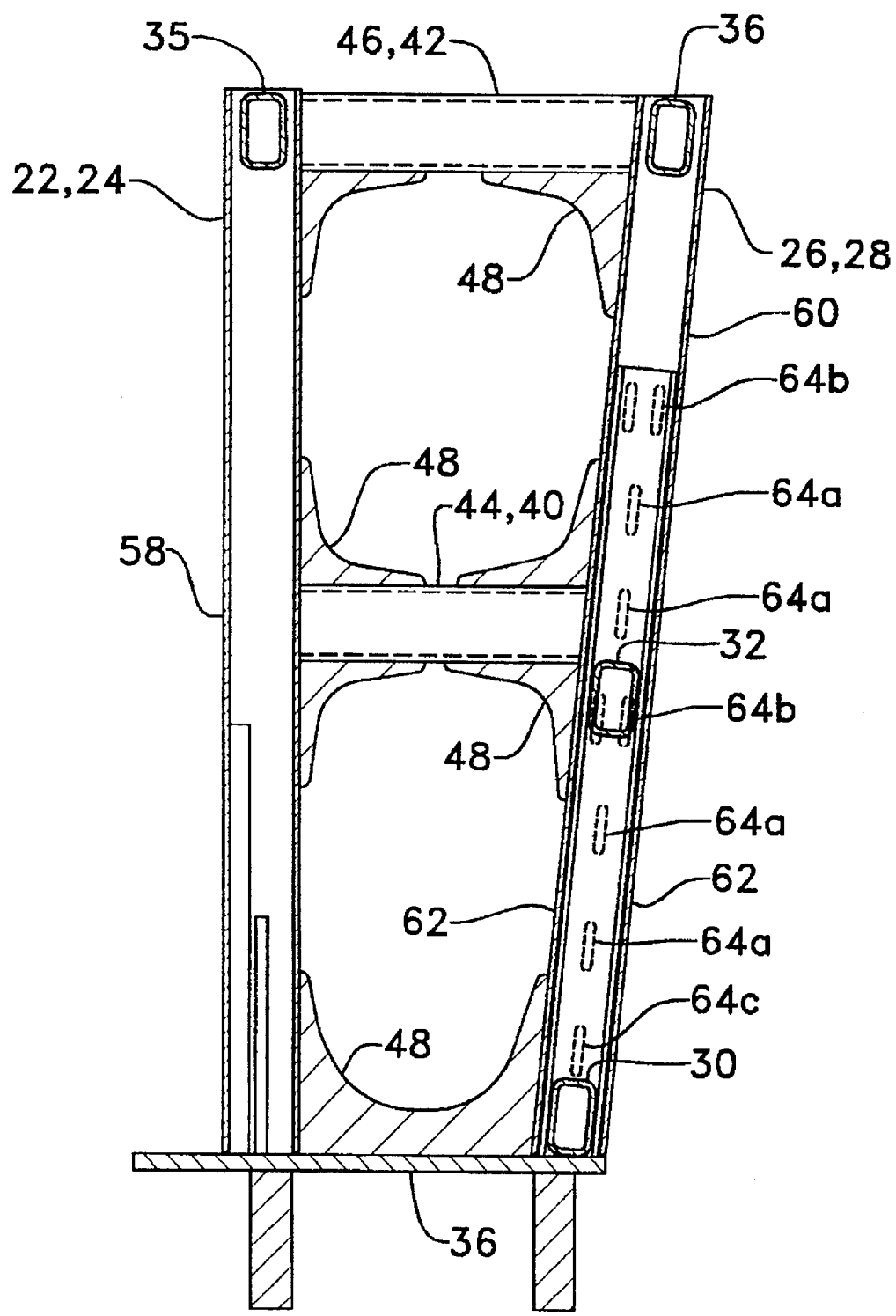
FIG. 5 is a side elevational view of the ROPS of FIG. 1.

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring now to FIG. 1, a four-post ROPS 20 is disclosed including front posts 22 and 24 and rear posts 26 and 28 as the main upright supports. Cross members 30, 32 and 34 are attached to and extend between rear posts 26 and 28 at elevational locations between a mounting plate 36 and the top 38 of ROPS 20, and cross member 35 is attached to and extends between front posts 22 and 24 adjacent to the top 38 of ROPS 20. In a similar fashion, cross members 40 and 42 are attached to and extend between front post 22 and rear post 26 at elevational locations between mounting plate 36 and the top 38 of ROPS 20, and cross members 44 and 46 are attached to and extend between front post 24 and rear post 28 at elevational locations between mounting plate 36 and the top 38 of ROPS 20. Various gussets 48 reinforce the attachments between the posts and cross members.

In the preferred embodiment shown, the various posts, cross members and gussets of ROPS 20 are welded together to define a ROPS frame. However, other attachments known in the art are also contemplated for the ROPS frame while still keeping within the present invention. The particular attachment is a function of the loads for which the frame is designed to withstand. Further, in the specific preferred embodiment, the various welds are full penetration welds; however, other welds and associated heat treatments known in the art are also contemplated while still keeping within the present invention.

The four generally upright posts 22,24,26,28 and the eight cross members 30,32,34,35,40,42,44,46 together with the base plate 36 define generally a rigid box-like structure which provides stable deformation so as to maintain resistance to additional load deformation as the structure is deformed. In a typical four-post ROPS, the upright posts initially elastically deform; that is, the posts provide increasing resistance to deformation as the ROPS deflects. With increasing load, the posts plastically deform; that is, the posts provide a relatively level or constant resistance to deformation as the ROPS further deflects. Ultimately, the posts provide a decreasing resistance to deformation as the ROPS collapses. The range of plastic deformation through which the ROPS is able to maintain resistance is known as the collapse cushion.

Still, under extreme loading conditions and without additional reinforcement, portions of a four-post ROPS are subject to rapid plastic deformation which minimizes the collapse cushion for the ROPS. Therefore, it is desirable to identify portions of ROPS 20 which, when provided with additional reinforcement, extend the collapse cushion for the ROPS by maintaining resistance to deformation as the ROPS deflects.

Under such extreme loading conditions, ROPS 20 reacts loads in generally all directions, two of the significant directions being indicated by arrows 50 and 52. For reference purposes, arrow 50 indicates side loading between sides 54 and 56 of ROPS 20 and arrow 52 indicates fore and aft loading between the front 58 and rear 60 of ROPS 20. As ROPS 20 reacts extreme loads in these directions, it is subject to plastic deformation at elevational locations along the posts between the cross members. As such, posts 22,24, 26 and 28 are selectively reinforced in ROPS 20 to maintain resistance to deformation at the elevational locations as the ROPS deflects.

Referring now to FIG. 2, a cross-section of post 22 is shown which is also representative of posts 24,26 and 28. Post 22 is constructed of square tubing approximately 0.37 inches thick and 5.0 inches in length along a side. A reinforcing member 62 is attached within post 22. In the preferred embodiment, slots 64 are provided in post 22 to provide weld access to member 62 from outside post 22. As such, reinforcing member 62 is easily added during assembly of ROPS 20. As shown in FIG. 3, reinforcing member 62 is a U-shaped member corresponding to the internal shape of post 22 and having a predetermined length associated with the particular post. For example, the reinforcing members of posts 22 and 24 are of a first predetermined length and the reinforcing members of posts 26 and 28 are of a second, longer predetermined length as discussed hereinafter. The particular means for reinforcing post 22, although important to the performance of ROPS 20 under loading, is not as important as the placement of the reinforcing member within ROPS 20. For example, other shaped reinforcing members, such as but not limited to flat plates and corner gussets, are contemplated which when placed according to the present invention would adequately stiffen ROPS 20.

Referring back to FIG. 1 and also to FIGS. 4 and 5, reinforcing members 62 are selectively attached within ROPS 20 to provide stiffening at locations which experience high compressive stresses and therefore which are subject to buckling under extreme loads. In order to provide maximum resistance to deformation as the ROPS deflects, while minimizing weight and cost of the ROPS, reinforcing members 62 are attached at four locations which correspond generally to the four ROPS posts.

In particular, reinforcing members 62 are attached to the outermost front sides of posts 22 and 24 to strengthen posts 22 and 24 against buckling under rearwardly applied loads; that is, the outermost front portion of posts 22 and 24 opposite a load applied in the direction of arrow 52a to the rear 60 of ROPS 20. Similarly, reinforcing members 62 are attached to the outermost sides of posts 26 and 28 to strengthen posts 26 and 28 against buckling under sidewardly applied loads; that is, the outermost side portion of post 26 opposite a load applied in the direction of arrow 50b to side 56 of ROPS 20 and the outermost side portion of post 28 opposite a load applied in the direction of arrow 50a to side 54 of ROPS 20.

In the specific preferred embodiment shown, the reinforcing members are further tailored to provide maximum reinforcement at the point of highest compressive stress under load for each of posts 22,24,26 and 28. In particular, reinforcing members 62 are attached within posts 22 and 24 adjacent to base member 36 and span generally between base member 36 and cross members 40 and 44 to provide maximum stiffness at a point intermediate base member 36 and cross members 40 and 44, respectively. Similarly, reinforcing members 62 are attached within posts 26 and 28 adjacent to base member 36 and cross members 40 and 44 and span generally between base member 36 to above cross members 40 and 44 to provide maximum stiffness at points intermediate base member 36 and cross members 40 and 44, respectively, and at points intermediate cross members 40 and 44 and cross members 42 and 46, respectively.

Also critical to the performance of ROPS 20 is the placement of weld slots 64 relative to the central axis 66 (FIG. 2) of the post. Such placement is important due to the metallurgical and geometric notch point created by the slot and weld at the corners of the post. Single slots 64a are provided along the central axis 66 at points of attachment longitudinally near the point of highest compressive stress, while double slots 64b are provided at either side of and adjacent to the central axis 66 at points of attachment longitudinally away from the point of highest compressive stress.

For example, single weld slots 64a are provided in posts 22 and 24 along central axis 66 intermediate base member 36 and cross members 40 and 44, respectively, to minimize the total stress at the weld slot resulting from loads applied in the direction of arrows 52a and 52b. Similarly, single weld slots 64a are provided in posts 26 and 28 intermediate base member 36 and cross members 40 and 44 and intermediate cross members 40 and 44 and cross members 42 and 46, respectively, to minimize the total stress at the weld slot resulting from loads applied in the direction of arrow 50a and 50b.

Conversely, double weld slots 64b are provided in posts 22 and 24 at either side of and adjacent to central axis 66 adjacent to cross members 40 and 44, respectively, where stresses are low and a solid attachment is critical. Similarly, double weld slots 64b are provided in posts 26 and 28 at and remote from cross members 40 and 44, respectively, where stresses are low and a solid attachment is critical. It should be noted that weld slots 64c are single weld slots only because the ends of posts 22,24,26 and 28 are otherwise accessible for internally applied welds to provide for a solid attachment.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

For example, other embodiments than the specific preferred embodiment shown herein might come within the spirit of the invention if they selectively apply reinforcing members to a ROPS in the manner indicated above or, otherwise, as described in the appended claims.

What is claimed is:

1. A rollover protective structure for use with construction machinery, comprising:
   a base member;
   four posts, each including a hollow portion, attached to said base member and a number of cross members attached between said four posts, said four posts and said number of cross members defining generally a box-like structure;
   first and second of said four posts including first and second sides, respectively, facing a first direction, a third of said four posts including a third side facing a second direction transverse to said first direction and the fourth of said four posts including a fourth side facing a third direction transverse to said first direction and opposite said second direction;
   first and second reinforcing members attached to said first and second sides within the hollow portion of said first and second posts, respectively, for reinforcing said first and second sides; and
   third and fourth reinforcing members attached to said third and fourth sides within the hollow portion of said third and fourth posts, respectively, for reinforcing said third and fourth sides.

2. The rollover protective structure of claim 1, wherein:
   said number of cross members includes a first cross member attached between said first post and said third post and a second cross member attached between second post and said fourth post;
   said first and second reinforcing members each have a first predetermined length which extends from said base member to the attachment of said first and second cross members to said first and second posts, respectively; and
   said third and fourth reinforcing members each have a second predetermined length which extends between said base member and the attachment of said first and second cross members to said third and fourth posts, respectively.

3. The rollover protective structure of claim 2, wherein:
   said number of cross members includes a third cross member attached between said first post and said third post and a fourth cross member attached between second post and said fourth post, said first and second cross members being disposed between said base member and said third and fourth cross members, respectively; and
   said third and fourth reinforcing members each have a second predetermined length which extends from said base member to a point between the attachment of said first and second cross members to said third and fourth posts and the attachment of said third and fourth cross members to said third and fourth posts, respectively.

4. The rollover protective structure of claim 1, wherein:
   said first and second posts each include a first number of longitudinally disposed slots which extend through said first and second sides to permit weld access to said first and second reinforcing members, respectively; and
   said third and fourth posts each include a second number of longitudinally disposed slots which extend through said third and fourth sides to permit weld access to said third and fourth reinforcing members, respectively.

5. The rollover protective structure of claim 4, wherein:
   said first and second posts each define a first central axis; and
   said first number of longitudinally disposed slots include a single slot disposed along said central axis and intermediate said base member and the attachment of said first cross member to said first post and a pair of slots disposed on either side of said central axis and adjacent to the attachment of said first cross member to said first post.

6. The rollover protective structure of claim 4, wherein:
   said third and fourth posts each define a second cross-sectional central axis; and
   said second number of longitudinally disposed slots include a single slot disposed along said central axis and intermediate said base member and the attachment of said first cross member to said third post and a pair of slots disposed on either side of said central axis and adjacent to the attachment of said first cross member to said third post.

7. The rollover protective structure of claim 1, wherein said first and second reinforcing members and said third and fourth reinforcing members are channels C-shaped in cross-section.

8. A rollover protective structure for use with construction machinery, comprising:
   a base member;
   a first tubular post attached to said base member, said first post being rectangular in cross-section and defining a first side facing a first direction;

a second tubular post attached to said base member, said second post being rectangular in cross-section and defining a second side facing a second direction transverse to said first direction;

a cross member attached between said first post and said second post;

said first post defining a first central axis and said second post defining a second central axis;

a first reinforcing member adapted for receipt in said first post adjacent to said first side for reinforcing said first side;

a second reinforcing member adapted for receipt in said second post adjacent to said second side for reinforcing said second side;

first means, disposed along said first axis, for attaching said first reinforcing member within said first post adjacent to said first side; and second means, disposed along said second axis, for attaching said second reinforcing member within said second post adjacent to said second side.

9. The rollover protective structure of claim 8, wherein:

said first reinforcing member has a first predetermined length which extends from said base member to the attachment of said first cross member to said first post; and said second reinforcing members has a second predetermined length which extends between said base member and the attachment of said first cross member to said second post.

10. The rollover protective structure of claim 9, and further comprising:

a second cross member attached between said first post and said second post, said first cross member being disposed between said base member and said second cross member;

wherein said second reinforcing member has a second predetermined length which extends from said base member to a point between the attachment of said first cross member to said second post and the attachment of said second cross member to said second posts.

11. The rollover protective structure of claim 10, wherein:

said first means includes a first number of longitudinally disposed slots which extend through said first side to permit weld access to said first reinforcing member; and said second means includes a second number of longitudinally disposed slots which extend through said second side to permit weld access to said second reinforcing member.

12. The rollover protective structure of claim 11, wherein:

said first number of longitudinally disposed slots include a single slot disposed along said first central axis and intermediate said base member and the attachment of said first cross member to said first post and a pair of slots disposed on either side of said first central axis and adjacent to the attachment of said first cross member to said first post; and said second number of longitudinally disposed slots include a single slot disposed along said second central axis and intermediate said base member and the attachment of said first cross member to said second post and a pair of slots disposed on either side of said second central axis and adjacent to the attachment of said first cross member to said second post.

13. The rollover protective structure of claim 8, wherein said first and second reinforcing members are channels C-shaped in cross-section.

14. A method for reinforcing a rollover protective structure for use with construction machinery, the rollover protective structure including a base member, four posts each including a hollow portion attached to said base member and a number of cross members attached between said four posts, said four posts and said number of cross members defining generally a box-like structure, first and second of said four posts including first and second sides, respectively, facing a first direction, a third of said four posts including a third side facing a second direction transverse to said first direction and the fourth of said four posts including a fourth side facing a third direction transverse to said first direction and opposite said second direction, the method comprising the steps of;

attaching first and second reinforcing members to said first and second sides within the hollow portion of said first and second posts, respectively, for reinforcing said first and second sides; and attaching third and fourth reinforcing members to said third and fourth sides within the hollow portion of said third and fourth posts, respectively, for reinforcing said third and fourth sides.

15. A method for reinforcing a rollover protective structure for use with construction machinery, the rollover protective structure including a base member, a first tubular post attached to said base member, said first post being rectangular in cross-section and defining a first side facing a first direction, a second tubular post attached to said base member, said second post being rectangular in cross-section and defining a second side facing a second direction transverse to said first direction, a cross member attached between said first post and said second post, said first post defining a first central axis and said second post defining a second central axis, the method comprising the steps of:

obtaining a first reinforcing member adapted for receipt in said first post adjacent to said first side for reinforcing said first side;

obtaining a second reinforcing member adapted for receipt in said second post adjacent to said second side for reinforcing said second side;

attaching said first reinforcing member within said first post adjacent to said first side along said first central axis; and attaching said second reinforcing member within said second post adjacent to said second side along said second central axis.

* * * * *